US009927048B2

(12) United States Patent
Zimmerman

(10) Patent No.: US 9,927,048 B2
(45) Date of Patent: Mar. 27, 2018

(54) HOSE CADDY FOR POWERED IMPLEMENTS MOUNTED ON LOADERS

(71) Applicant: Joseph M. Zimmerman, Manheim, PA (US)

(72) Inventor: Joseph M. Zimmerman, Manheim, PA (US)

(*) Notice: Subject to any disclaimer, the term of this patent is extended or adjusted under 35 U.S.C. 154(b) by 56 days.

(21) Appl. No.: 15/142,986

(22) Filed: Apr. 29, 2016

(65) Prior Publication Data

US 2016/0281882 A1    Sep. 29, 2016

Related U.S. Application Data

(63) Continuation-in-part of application No. 14/669,320, filed on Mar. 26, 2015, now abandoned.

(60) Provisional application No. 61/971,027, filed on Mar. 27, 2014.

(51) Int. Cl.

| | |
|---|---|
| *E02F 9/22* | (2006.01) |
| *F16L 3/12* | (2006.01) |
| *F16L 3/23* | (2006.01) |
| *F16L 3/26* | (2006.01) |
| *E02F 3/40* | (2006.01) |
| *E02F 3/96* | (2006.01) |

(52) U.S. Cl.
CPC ............ *F16L 3/1222* (2013.01); *E02F 3/404* (2013.01); *E02F 3/962* (2013.01); *E02F 9/2275* (2013.01); *F16L 3/23* (2013.01); *F16L 3/26* (2013.01)

(58) Field of Classification Search
CPC ....... E02F 9/2275; E02F 3/3654; E02F 3/962; E02F 3/404
See application file for complete search history.

(56) References Cited

U.S. PATENT DOCUMENTS

| | | | | |
|---|---|---|---|---|
| 2,619,888 | A | * 12/1952 | Young | B60K 17/10 172/316 |
| 2,626,552 | A | * 1/1953 | Oehler | A01B 63/114 172/316 |
| 3,279,822 | A | * 10/1966 | Orendorff | A01B 63/22 172/316 |
| 3,335,888 | A | 8/1967 | Kugler | |
| 3,779,408 | A | 12/1973 | Ivie | |
| 3,847,266 | A | 11/1974 | Cox | |
| 4,157,164 | A | 6/1979 | Helm | |
| 5,495,987 | A | 3/1996 | Slabey | |

(Continued)

*Primary Examiner* — Gerald McClain
(74) *Attorney, Agent, or Firm* — Miller Law Group, PLLC

(57) ABSTRACT

A hose caddy is pivotally mounted on a powered implement connected to the boom arms of a loader to control the positioning of hydraulic hoses or electrical wiring. The hose caddy is formed with an elongated retention member that provides for the detachable mounting of a first support member at the upper end and a second support member at the lower end. Each support member has a detachable hose clamp member for engaging the hoses and controlling the positioning of the hoses relative to the retention member. The retention member is pivotally connected to an implement mounting bracket by a pivot pin. A spring biasing mechanism mounts on the pivot pin to bias the pivotal movement of the implement mounting bracket toward the retention member. A bunk defacing apparatus is also disclosed to facilitate the operation of dislodging and collecting silage material from a compacted bunker of silage material.

5 Claims, 12 Drawing Sheets

(56) References Cited

U.S. PATENT DOCUMENTS

| | | | | |
|---|---|---|---|---|
| 6,095,181 A | * | 8/2000 | Irwin | F16L 3/015 |
| | | | | 137/351 |
| 6,841,322 B1 | | 1/2005 | Lee | |
| 7,429,159 B2 | * | 9/2008 | Priest | E02F 3/962 |
| | | | | 414/724 |
| 9,706,707 B2 | * | 7/2017 | Enns | A01D 41/142 |
| 2007/0175071 A1 | * | 8/2007 | Priest | E02F 3/962 |
| | | | | 37/404 |
| 2008/0110650 A1 | * | 5/2008 | Martin | E02F 9/2275 |
| | | | | 172/667 |
| 2009/0211121 A1 | * | 8/2009 | Doster, Jr. | E02F 9/006 |
| | | | | 37/468 |
| 2014/0224941 A1 | * | 8/2014 | Gitter | E02F 9/2275 |
| | | | | 248/68.1 |

* cited by examiner

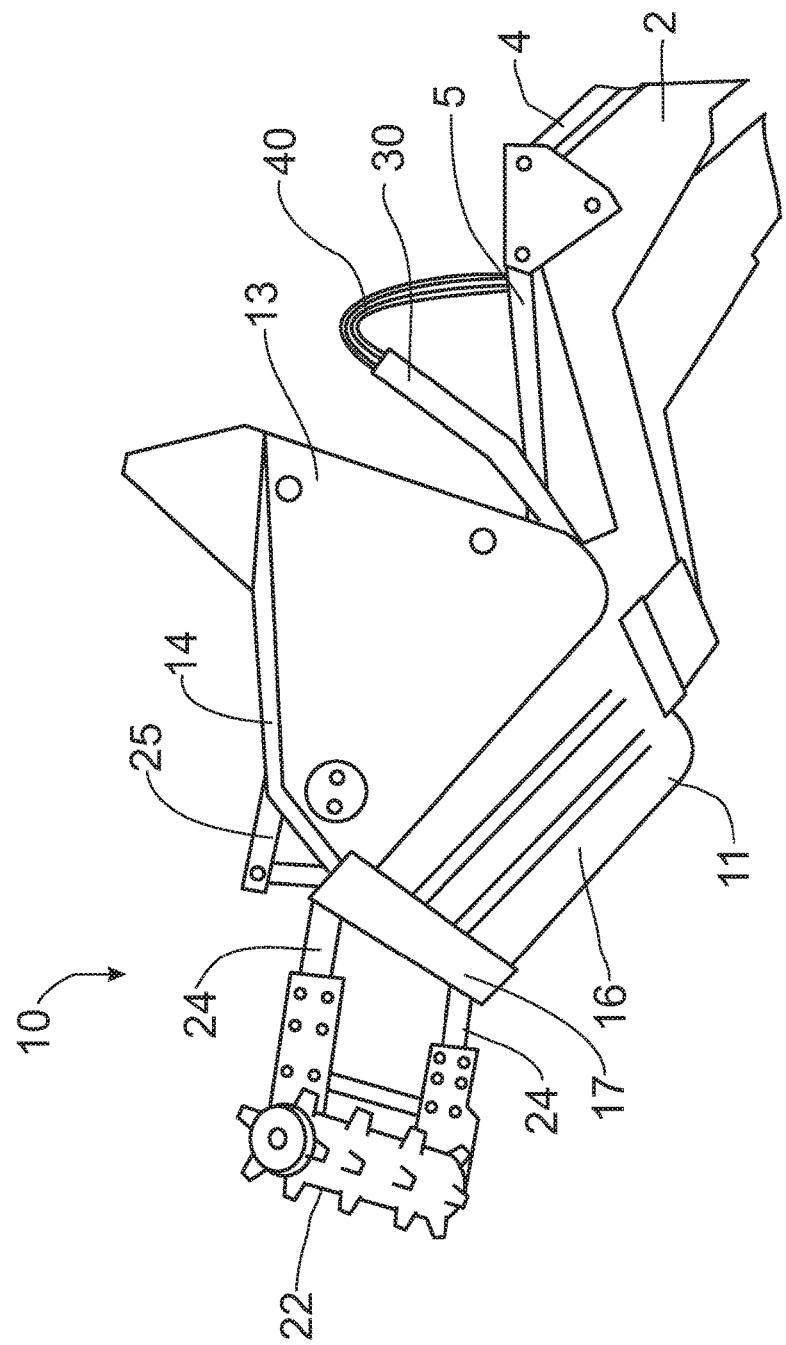

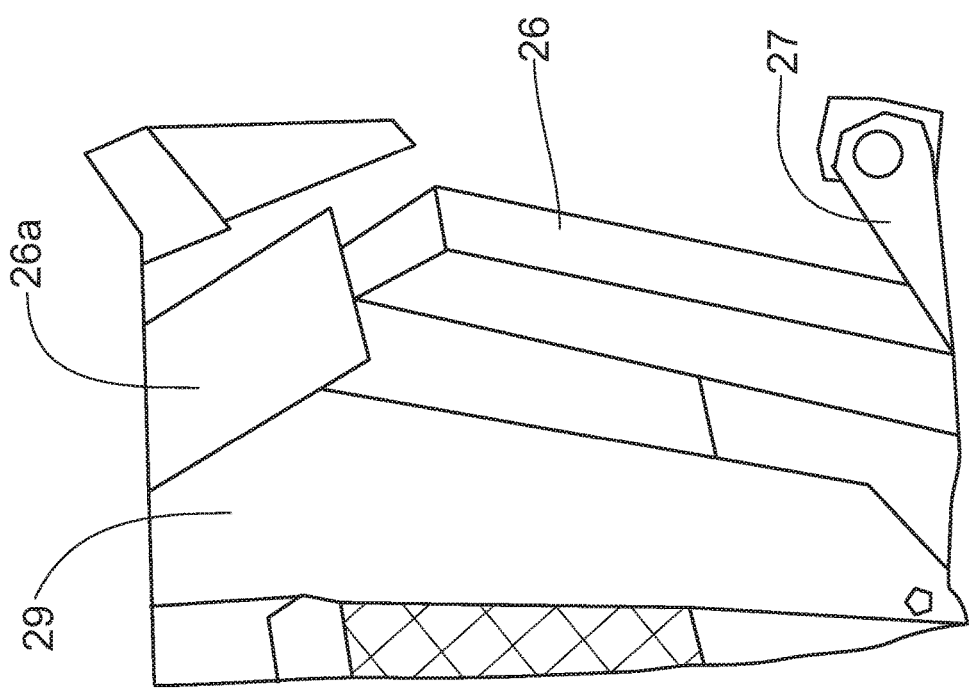
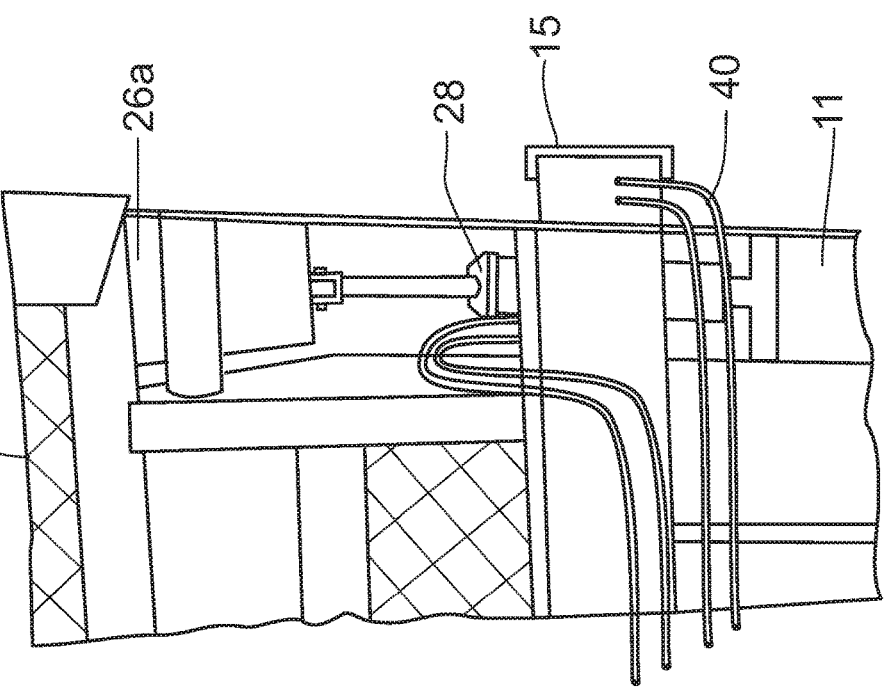

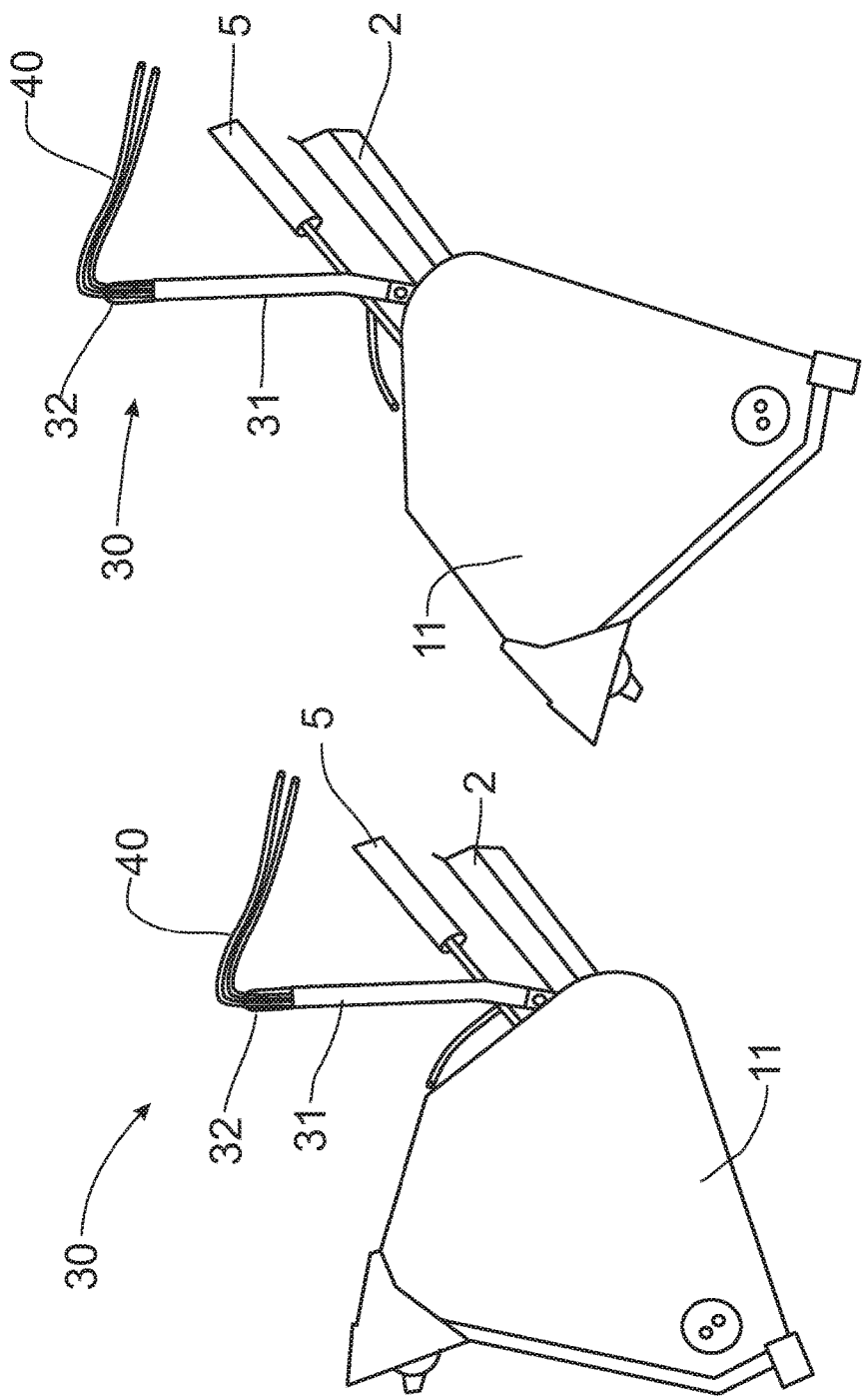

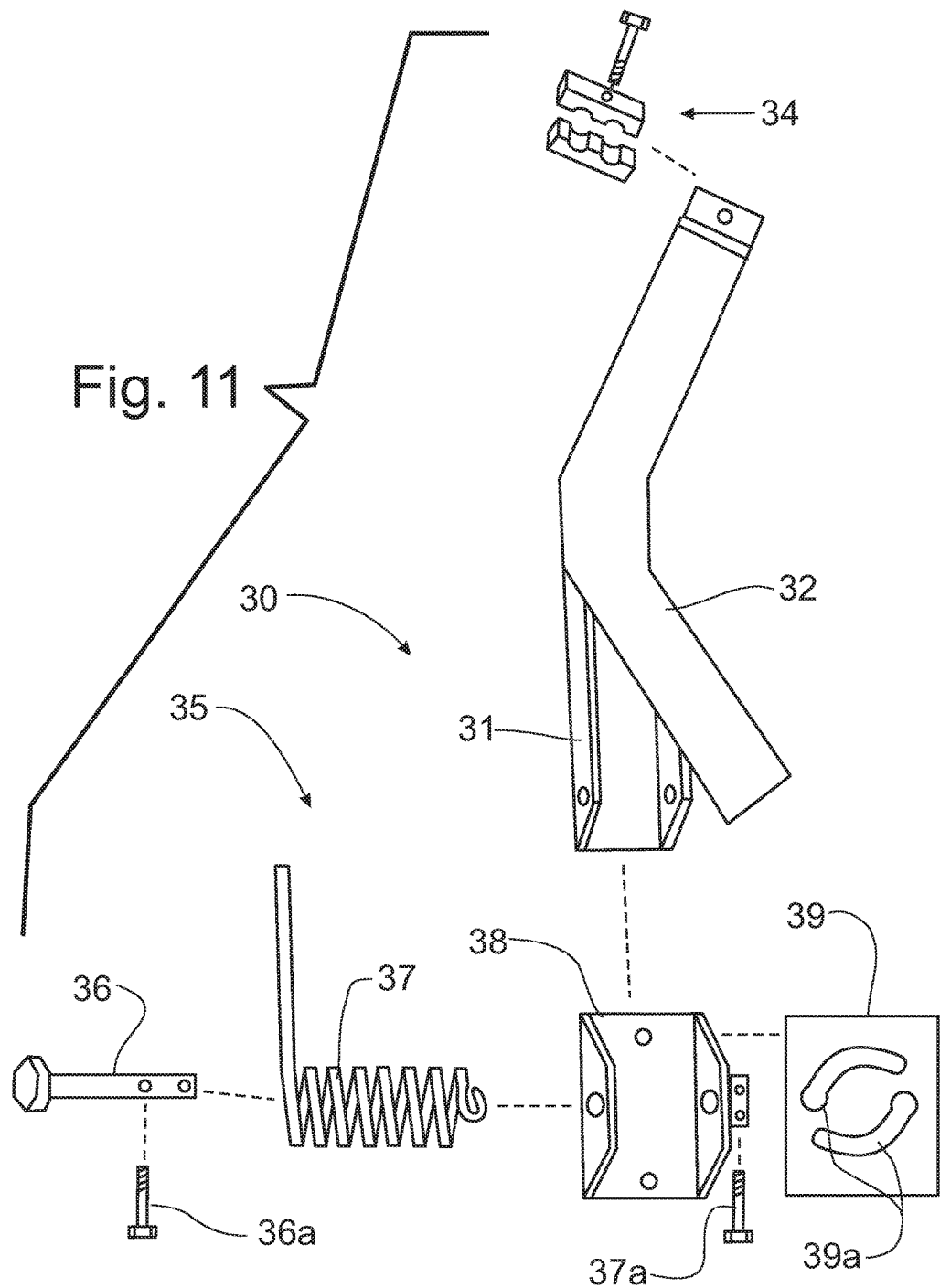

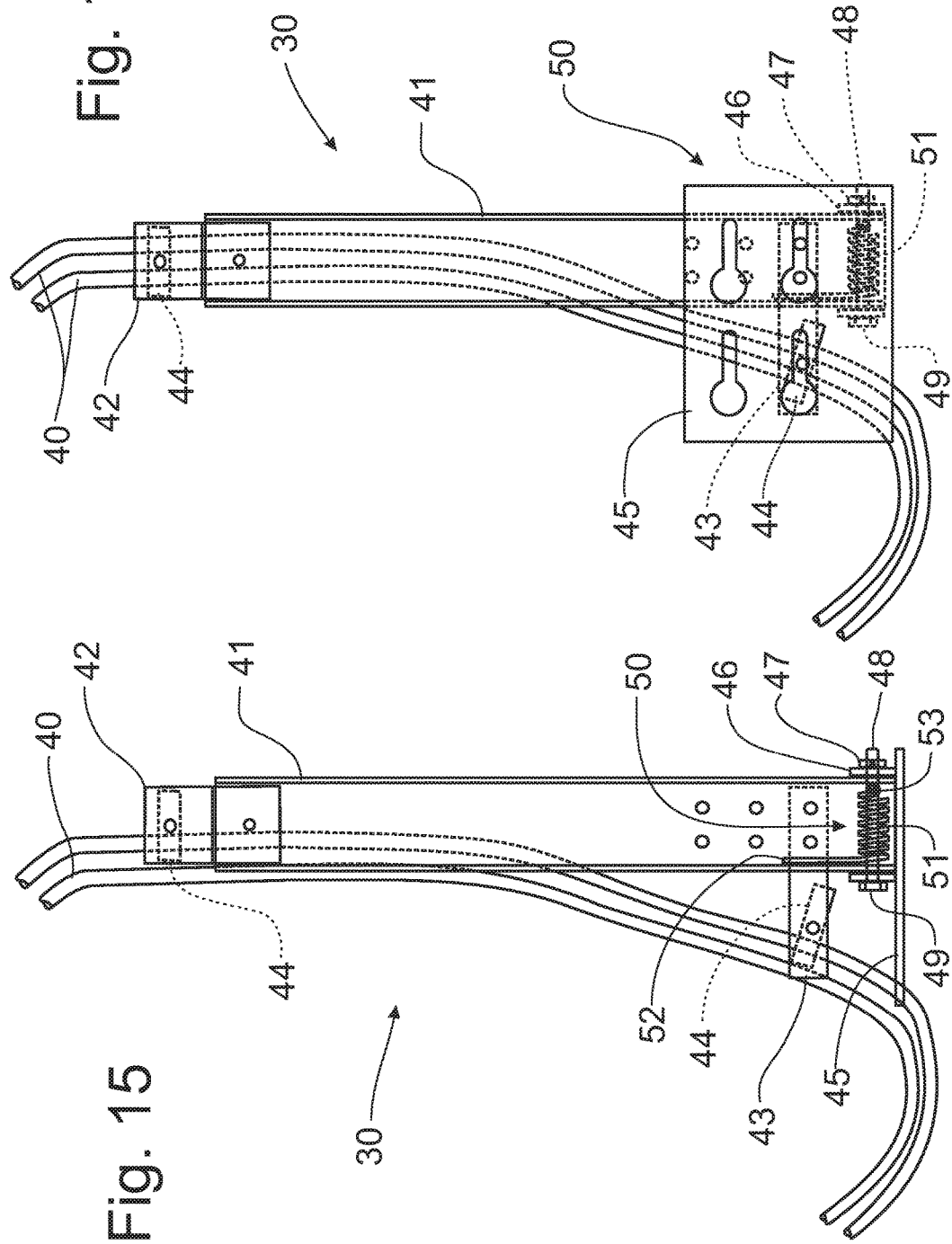

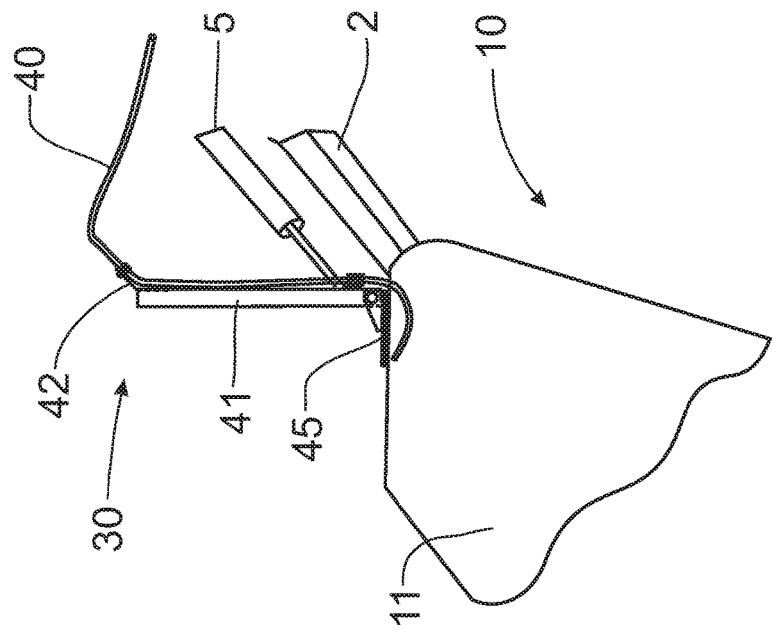
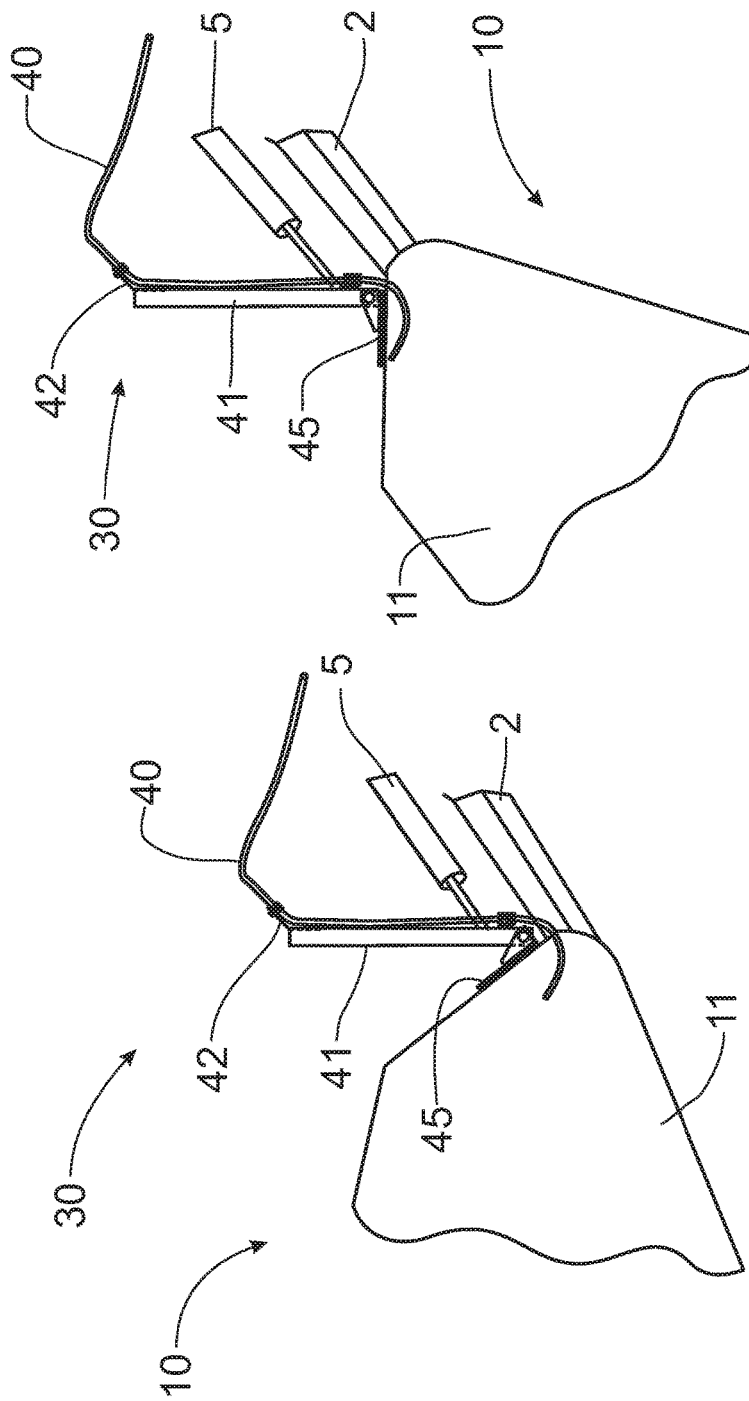

HOSE CADDY FOR POWERED IMPLEMENTS MOUNTED ON LOADERS

CROSS-REFERENCE TO RELATED APPLICATIONS

This application is a continuation-in-part of U.S. patent application Ser. No. 14/669,320, filed on Mar. 26, 2015, now abandoned, which claims domestic priority on U.S. Provisional Patent Application Ser. No. 61/971,027, filed on Mar. 27, 2014, the content of which is incorporated herein by reference.

FIELD OF THE INVENTION

This invention relates generally to attachments for skid steer loaders, and other loaders having hydraulic power available, and more particularly, to a loader bucket having a bunk defacer mounted therein for defacing forage bunkers and removing the collected forage material.

BACKGROUND OF THE INVENTION

Skid steer loaders are well knows ground working machines that have hydraulically driven wheels that are fixed for rotation relative to the frame of the machine. Steering is accomplished by controlling the rotation of the wheels on opposite sides of the machine such that a differential in rotational speeds will result in a turning of the machine. The skid steer loader has a centrally positioned operator compartment mounted on the frame with an engine typically located behind the operator. A pair of boom arms is pivotally supported on the frame for vertical movement on opposite sides of the operator compartment. These boom arms are connected together forwardly of the operator compartment with an attachment plate through which various attachments can be mounted to the boom arms.

Skid steer loaders are manufactured in many sizes for use in a variety of operations from cleaning chicken houses to moving materials from one location to another. Because of the versatility of skid steer loaders many attachments have been devised for mounting on the boom arms forwardly of the operator to accomplish the desired operation for the skid steer loader. One simple such attachment is a loader bucket that has a mechanism along the rearward wall to permit connection with the attachment plate and is then operable to scoop materials, such as feed for animals, with the forward movement of the machine and to elevate those materials by vertically moving the boom arms. Hydraulic cylinders controllable by the operator allow the bucket to rotate about a pivot axis to tip the bucket in order for the materials to spill out of the bucket.

Devices for defacing and removing compacted silage material placed into bunkers are known in the art. In U.S. Pat. No. 6,841,322 granted on Nov. 9, 2004, to Kenneth Slabey, a bunk defacer is mounted on a skid steer loader and is hydraulically powered from the auxiliary hydraulic system of the skid steer loader. The bunk defacer is mounted on the boom arms of the skid steer loader and is movable vertically by moving the boom arms. In an earlier U.S. Pat. No. 5,495,987 granted on Mar. 5, 1996, to Kenneth Slabey, this bunk defacer is shown mounted to the boom arms and cooperable with a loader bucket to load a quantity of the forage material into the bucket for transport away from the silage bunker.

In U.S. Pat. No. 4,157,164, granted to Arnold Helm, et al on Jun. 5, 1979, a self-propelled forage harvesting machine is equipped with a bunk defacer rotor supported on the distal end of boom arms to disintegrate the face of compacted silage material for feeding into the forage harvesting machine. U.S. Pat. No. 3,335,888, issued on Aug. 15, 1967, to Henry Kugler, discloses a silage loader in the form of a belt conveyor that includes teeth that deface the front surface of compacted silage in a bunker, and loads the disintegrated silage into a loader bucket mounted on a tractor. The conveyor belt is hydraulic driven and is positionably supported on the loader bucket.

In U.S. Pat. No. 3,779,408, issued to Louis Ivie on Dec. 18, 1973, a bunk defacer is pivotally mounted on the boom arms of a tractor-mounted bucket loader and is operable to be moved vertically to disintegrate compacted silage material and load the disintegrated material into the loader bucket beneath the bunk defacer apparatus. The bunk defacer is hydraulically driven from the tractor's hydraulic system and is provided with a separate hydraulic lift system to cause pivotal movement thereof. The bunk defacer apparatus in U.S. Pat. No. 3,847,266, granted on Nov. 12, 1974, to Celbert Cox, is pivotally mounted on top of a belt conveyor mechanism such that the bunk defacer rotor dislodges silage material that is collected in a lower collection bucket and is elevated and transported rearwardly by the belt conveyor. The bunk defacer rotor is supported on a frame assembly that includes a four bar linkage that not only moves the rotor vertically, but also extends the rotor longitudinally.

It would be desirable to provide a combination loader bucket and bunk defacing apparatus in which the bunk defacer could be retracted into the confines of the loader bucket when not being utilized to dislodge compacted silage material from the front face of a silage bunker. Preferably, the loader bucket would be attachable to a skid steer loader or any other loader apparatus providing an auxiliary supply of hydraulic fluid under pressure.

SUMMARY OF THE INVENTION

It is an object of this invention to overcome the disadvantages of the prior art by providing a bunk defacing apparatus that is carried in a loader bucket.

It is another object of this invention to provide a bunk defacing apparatus that is retractable into the confines of a loader bucket when not in use.

It is an advantage of this invention that the bunk defacing apparatus can be stowed in a retracted configuration within the confines of a loader bucket so that the loader bucket can be utilized to convey material.

It is a feature of this invention that the bunk defacing apparatus includes a powered rotor mounted on pivot arms that are operable to extend the rotor outwardly away from the loader bucket to detach forage material from a compacted base of forage material.

It is another feature of this invention that the loader bucket is configured to retract the bunk defacing apparatus into housing boxes arranged to receive the pivot linkage assembly.

It is still another feature of this invention that the pivot linkage assembly if formed with cover plates that close the housing boxes when the pivot linkage assembly is retracted and received within the housing boxes.

It is another advantage of this invention that the cover plates restrict the entry of silage material collected into the loader bucket into the housing boxes after the bunk defacing apparatus has been retracted into its inoperative position.

It is yet another feature of this invention that the rear sides of the housing boxes are opened to facilitate the removal of silage material that might collect in the housing boxes so that any silage material that might enter into the housing boxes will fall out when the loader bucket is tilted backward and raised through manipulation of the hydraulic cylinders controlling the orientation of the loader bucket.

It is still another feature of this invention that the loader bucket is reinforced to resist the operational forces associated with the defacing of a bunker of compacted silage material.

It is another feature of this invention that the rotor is powered through a hydraulic motor mounted internally of the rotor and operable to cause a rotation of the rotor when a flow of hydraulic fluid under pressure is provided to the hydraulic motor.

It is still another advantage of this invention that the internal mounting of the hydraulic motor within the rotor permits the lateral width of the rotor to be just a little smaller than the width of the loader bucket into which the bunk defacing apparatus is mounted.

It is yet another advantage of this invention that the hydraulic motor is capable of selectively rotating the bunk defacing rotor in opposite directions to enhance the operation of the bunk defacing apparatus in dislodging silage from a compacted bunker of silage material.

It is still another object of this invention to provide a combination bunk defacing apparatus and loader bucket that is mountable to and operable by a skid steer loader.

It is another feature of this invention that hydraulic cylinders operatively connected to the pivot linkage is operable to move the powered rotor of the bunk defacing apparatus between a contracted, stored inoperative position and an extended operative position in which the rotor is positioned outwardly of the loader bucket.

It is another advantage of this invention that the bunk defacing apparatus can be extended into its operative positioned, powered to allow the rotating toothed rotor to dislodge silage material from a compacted bunker of silage material, and then retracted into its inoperative position to allow the loader bucket to scoop and convey the dislodged silage material.

It is a further feature of this invention that the loader bucket is provided with open fencing material to permit the operator to observe the operation of the bunk defacing apparatus while providing safety from falling dislodged silage material.

It is a further advantage of this invention that the normal hydraulic controls for the operation of the loader bucket for tilt and elevation can be utilized to provide the same control functions for the powered rotor of the bunk defacing apparatus.

It is yet another object of this invention to provide a hose caddy apparatus that controls the positioning of hydraulic hoses providing a supply of hydraulic fluid under pressure from a prime mover to the hydraulic components on the bunk defacing apparatus.

It is a further feature of this invention that the hose caddy is formed with an enlarged head and/or a clamping device as a mechanism for holding the hydraulic conduits to direct the conduits into a hollow body that permits passage of the hydraulic conduits through the hollow body for use on the loader bucket.

It is a further advantage of this invention that the enlarged head enables a controlled bending of the hydraulic hoses into the hollow interior of the hose caddy.

It is still a further feature of this invention that the hose caddy is pivotally connected to the loader bucket.

It is yet another feature of this invention that the hose caddy is biased to return to a position next to the loader bucket or other implement or attachment carried on the boom arms of the loader.

It is still another advantage of this invention that the hose caddy defines a fixed length of hydraulic conduit between the hose caddy and source of hydraulic fluid carried on the loader so that the fixed length of hydraulic conduit causes the hose caddy to pivot away from the loader bucket or other attachment connected to the hydraulic conduits as the loader bucket or other attachment is pivoted relative to the boom arms.

It is yet another advantage of this invention that the spring bias on the hose caddy causes the hose caddy to pivot toward the loader bucket or other attachment.

It is still a further advantage of this invention that a fixed length of hydraulic hose extending between the source of hydraulic fluid on the prime mover and the enlarged head causes the hose caddy to pivot relative to the loader bucket when the loader bucket is pivotally manipulated relative to the boom arms on which the loader bucket is mounted.

It is a further object of this invention to provide a bias mechanism that maintains constant pressure or tension on the hose caddy arm relative to the loader bucket or other attachment connected to the boom arms.

It is a further feature of this invention that the bias mechanism can be provided by a spring apparatus that physically or hydraulically provides a mechanism to maintain constant pressure or tensioning.

It is another feature of this invention that the hose caddy can be utilized to control the positioning of hydraulic conduits, pneumatic conduits and electrical wiring that provides a power source to the loader bucket or other apparatus connected to the boom arms.

It is yet a further advantage of this invention that the hose caddy minimizes damage to hydraulic hoses associated with the operative movement of a loader bucket.

It is a further object of this invention to provide a combination loader bucket and bunk defacing apparatus, which is durable in construction, inexpensive of manufacture, carefree of maintenance, facile in assemblage, and simple and effective in use.

These and other objects, features and advantages are accomplished according to the instant invention by providing a hose caddy is pivotally mounted on a powered implement connected to the boom arms of a loader to control the positioning of hydraulic hoses or electrical wiring. The hose caddy is formed with an elongated retention member that provides for the detachable mounting of a first support member at the upper end and a second support member at the lower end. Each support member has a detachable hose clamp member for engaging the hoses and controlling the positioning of the hoses relative to the retention member. The retention member is pivotally connected to an implement mounting bracket by a pivot pin. A spring biasing mechanism mounts on the pivot pin to bias the pivotal movement of the implement mounting bracket toward the retention member. A bunk defacing apparatus is also disclosed to facilitate the operation of dislodging and collecting silage material from a compacted bunker of silage material.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is a left side elevational view of the combination bunk defacer and loader bucket with the bunk defacing apparatus extended into the operative position and the loader bucket being raised to a maximum height orientation;

FIG. 5 is an enlarged rear elevational view of the housing box within the right side of the cavity of the loader bucket to house one of the hydraulic cylinders for moving the bunk defacer between the operative and inoperative positions;

FIG. 6 is an enlarged, partial front perspective view of the housing box within the left side of the cavity of the loader bucket to house one of the hydraulic cylinders for moving the bunk defacer between the operative and inoperative positions;

FIG. 9 is a left side elevational view of the loader bucket having a hose caddy pivotally mounted thereto with the loader bucket tipped forwardly beyond the generally horizontal position depicted in FIG. 9;

FIG. 10 is a left, rear perspective view of the loader bucket having a hose caddy pivotally mounted thereto with the loader bucket tipped completely forwardly into a dumping orientation;

FIG. 11 is an exploded view showing the component parts of a second embodiment of the hose caddy;

FIG. 15 is a rear elevational view of the hose caddy depicted in FIG. 14 with the implement attachment bracket shown in a lowered position corresponding to the position of the implement depicted in FIG. 18;

FIG. 16 is a rear elevational view of the hose caddy depicted in FIG. 14 but showing the implement attachment bracket in a raised position corresponding to the position of the implement depicted in FIG. 17;

FIG. 17 is a schematic side elevational view of the alternative embodiment of the hose caddy shown in FIGS. 13-16 being mounted on a representative implement pivotally mounted on a loader and oriented in a raised position; and FIG. 18 is a schematic side elevational view of the alternative embodiment of the hose caddy shown in FIGS. 13-16 being mounted on a representative implement pivotally mounted on a loader and oriented in a lowered position.

DETAILED DESCRIPTION OF THE PREFERRED EMBODIMENT

Figure 1:
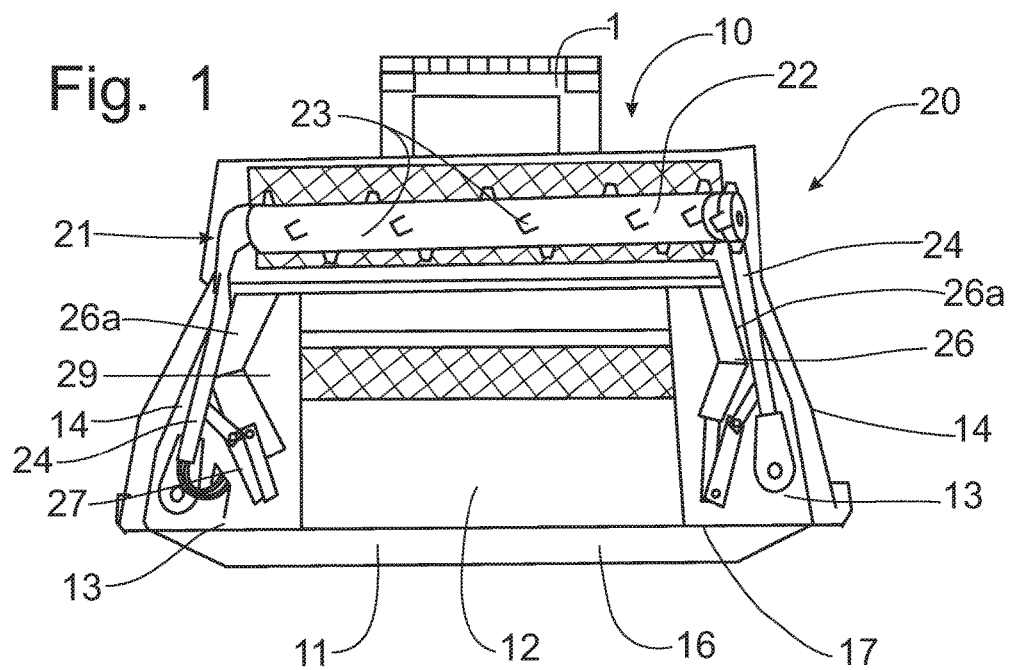
FIG. 1 is a front elevational view of a combination bunk defacer and loader bucket incorporating the principles of the instant invention, the bunk defacer and loader bucket being mounted on a skid steer loader to provide mobility and operative power to the bunk defacer and the loader bucket, the bunk defacer being retracted into the inoperative position.

Referring now to the drawings, the structural components of a combination bunk defacer and loader bucket attachment incorporating the principles of the instant invention can best be seen. Any left and right references are used as a matter of convenience and are determined by standing at the rear of the loader bucket attachment, such as from the orientation from the operator compartment of the skid steer loader, and facing the forward direction, the normal direction of travel of the skid steer loader, with the combination bunk defacer and loader bucket attachment mounted on the forward end of the skid steer loader. One skilled in the art will understand that the principles of the instant invention are not limited to a skid steer loader and that the combination bunk defacer and loader bucket attachment could be mounted onto any prime mover that supplies a source of hydraulic power for connection to the hydraulic cylinders and hydraulic motor, such as a tractor, as will be described in greater detail below. However, the preferred embodiment is the mounting of the combination bunk defacer and loader bucket combination as an attachment onto a skid steer loader, which is what is described herein and shown in the drawings.

Looking now to the drawings, the skid steer loader 1 is formed with a pair of boom arms 2 that extend to a mounting plate 3 interconnecting the forward ends of the two boom arms 2. The boom arms 2 are vertically movable through manipulation of the first hydraulic cylinders 4 that are anchored on the frame of the skid steer loader 1 and attached to the respective boom arms 2. A second pair of hydraulic cylinders 5 interconnects the boom arms and the mounting plate 3 to power the tipping movement of the mounting plate 3 and anything attached thereto. The skid steer loader 1 has at least two hydraulic ports 6 that detachably connect hydraulic hoses for the connection of attachments to the mounting plate 3 that need auxiliary hydraulic power for operation. More typically, the skid steer loader 1 will have several auxiliary hydraulic ports 6.

The combination bunk defacer and bucket loader attachment 10 has as a base member a loader bucket 11 formed with a back wall 12, opposing side walls 13 and a floor 16 terminating in a front edge 17. The back wall 12 is provided with a conventional mounting mechanism (not shown) on the rearward side of the back wall 12 that is cooperable with the mounting plate 3 on the skid steer loader 1 in a known manner. The loader bucket 11 establishes a cavity between the floor 16, the side walls 13 and the back wall 12 into which a supply of material, such as dislodged silage material, can be loaded.

The loader bucket 11 is formed with an outwardly flared forward edge 14 on both opposing side walls 13 to strengthen the side walls of the loader bucket 11 for the operational support of the bunk defacer 20, as will be described in greater detail below. The outwardly flared forward edges 14 of the side walls 13 merge into a corresponding downwardly flared front edge 17 of the floor of the bucket 11. The outward displacement of the forward edge 14 is sufficient to protect structure located outboard of the bucket side walls 13 and rearwardly of the forward edges 14, as will also be described in greater detail below.

The bunk defacer 20 is formed as a transversely extending rotor 22 with teeth 23 mounted on the periphery thereof to engage and dislodge compacted silage material from the front face of a silage bunker. The rotor 22 is mounted on a linkage assembly 25 that is housed on the interior of the loader bucket 11 along the interior sides of the opposing side walls 13. Therefore, the transverse width of the rotor 22 is slightly less than the transverse width of the loader bucket 11 as the rotor 22 and linkage 25 are stored within the confines of the loader bucket 11. The rotor 22 is mounted at the distal ends of a pair of opposing mounting arms 24 pivotally connected at a pivot 19 mounted to the opposing side walls 13 near the intersection of the forward edge 14 of the side walls 13 and the front edge 17 of the floor 16.

The linkage assembly 25 is positioned adjacent each opposing side wall 13 and includes a first link 26 pivotally supported on a box 29 mounted on the upper rear interior sides of the respective side walls 13, near the intersection of the forward edge 14 of the side walls 13 and the back wall 12. A second link 27 pivotally interconnects the forward end of each corresponding first link 26 and the corresponding mounting arm 24 to define three pivot points, i.e. the pivotal connection between the first link 26 and the box 29, the pivotal connection between the first and second links 26, 27, and the pivotal connection between the second link 27 and the mounting arm 24, which in turn is pivotally mounted by pivot 19 on the side walls 13 of the loader bucket 11. Hydraulic cylinders 28 are anchored on the loader bucket and connect, respectively, to the corresponding first link 26 to induce a pivotal movement of the first link 26. The hydraulic cylinders 28 are housed inside of the box 29 formed on the back wall 12 and corresponding side wall 13 to protect the hydraulic cylinder 28 from damage from the engagement with the collected silage material.

Figure 2:
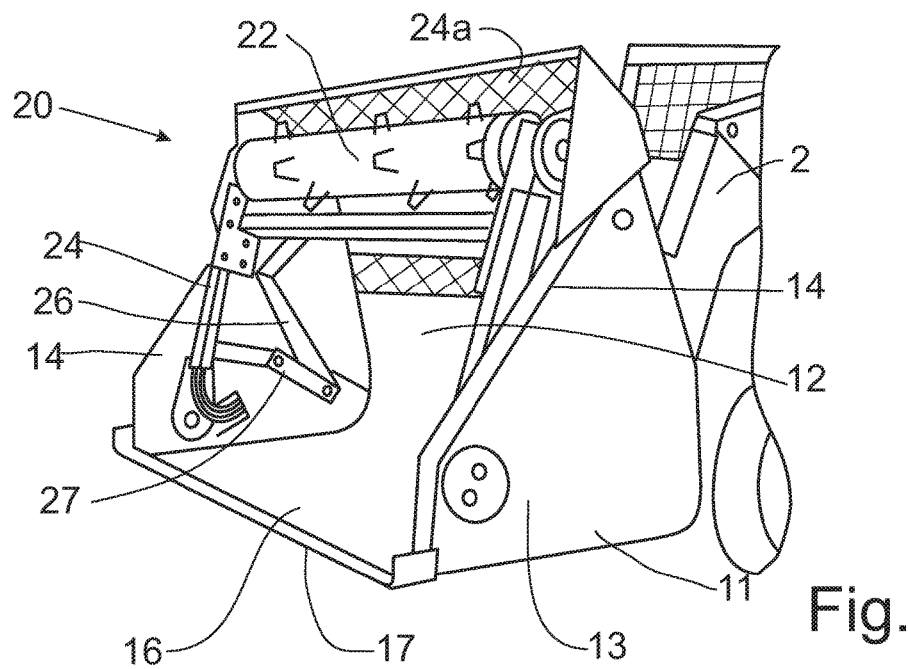
FIG. 2 is left, front perspective view of the bunk defacer and loader bucket combination shown in FIG. 1.
Figure 3:
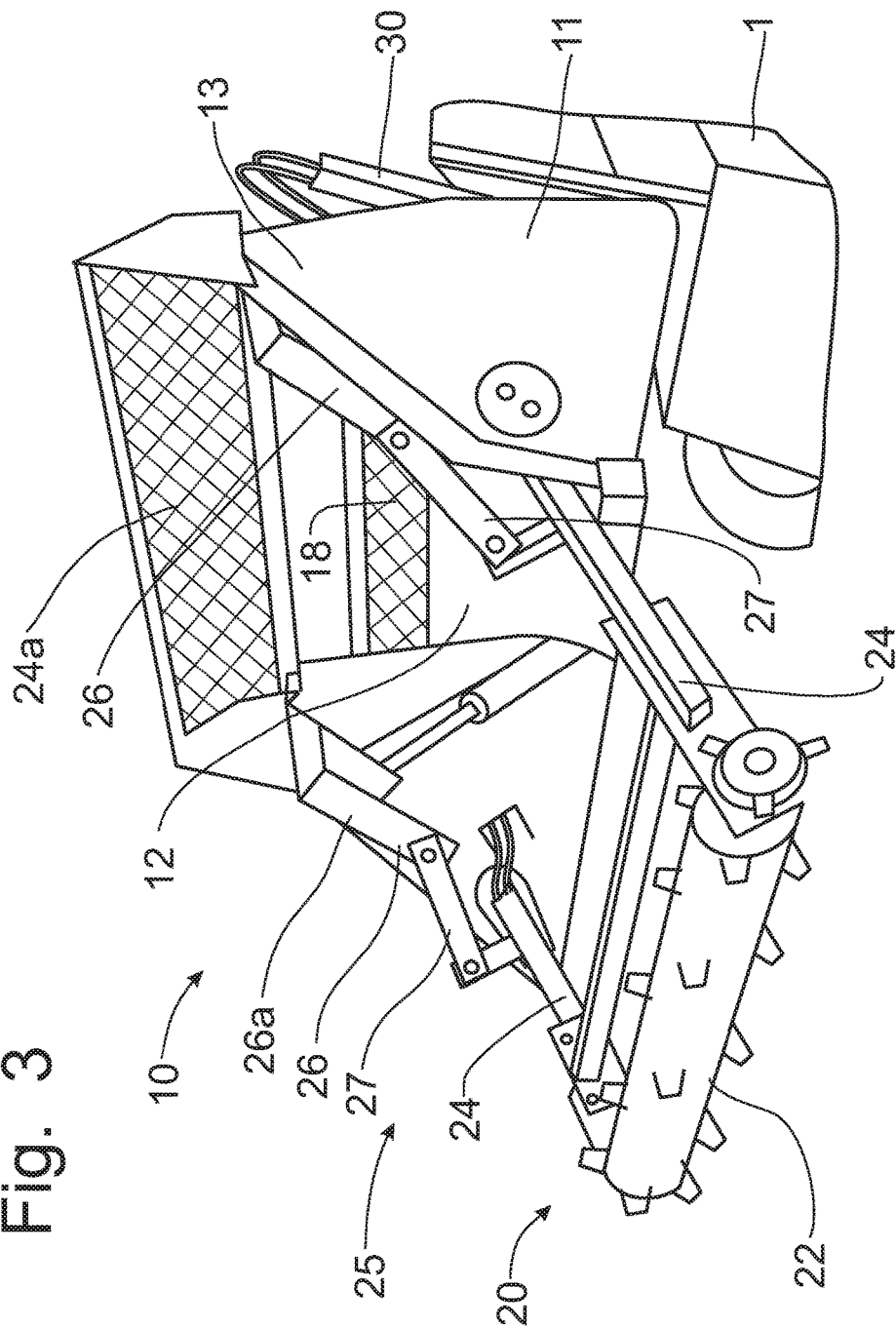
FIG. 3 is a left, front perspective view of the combination bunk defacer and loader bucket shown in FIG. 2, but with the bunk defacer being fully extended into the operative position with the loader bucket being oriented in a generally horizontal orientation.
Figure 7:
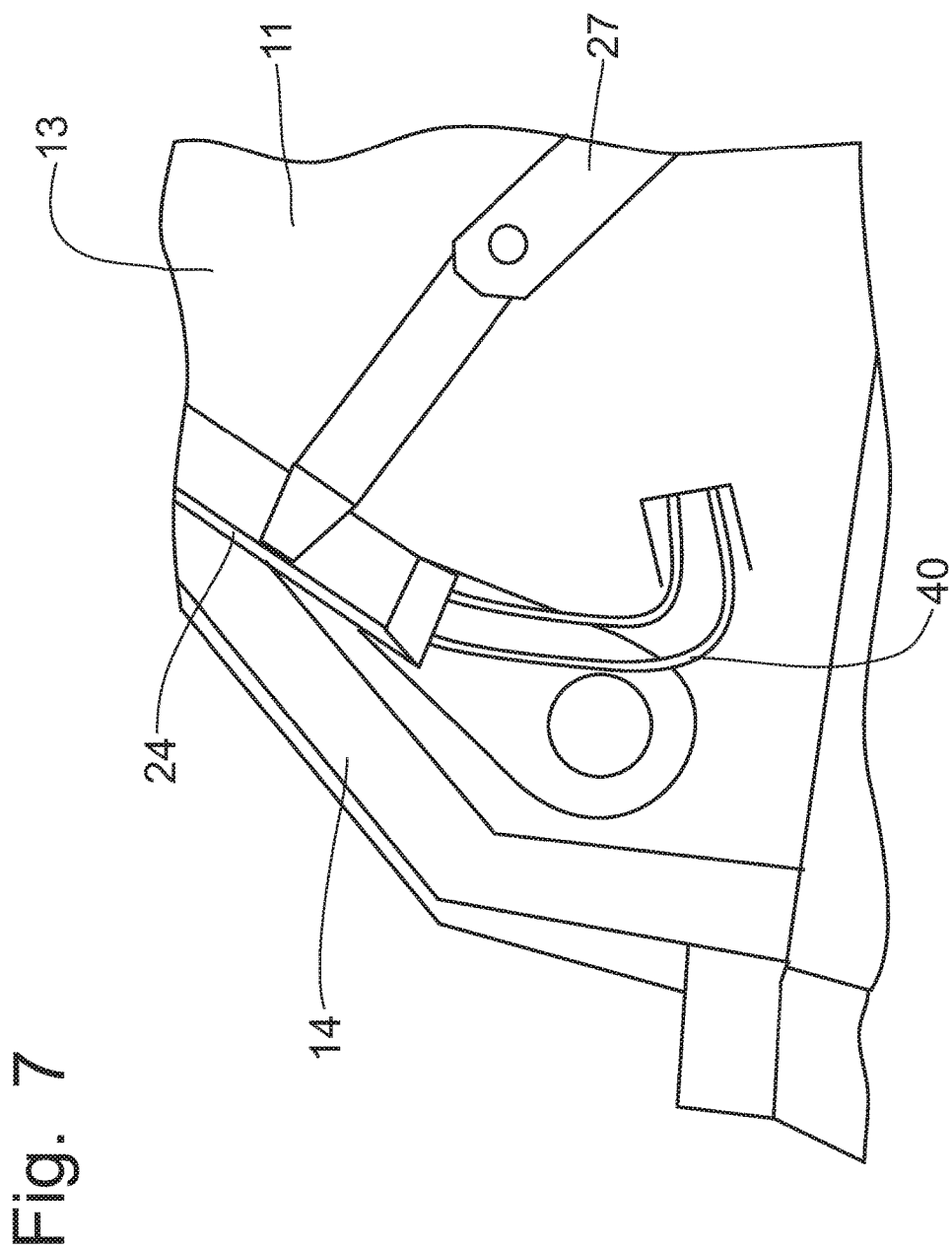
FIG. 7 is an enlarged, partial side elevational view of the pivotal mounting of the right mounting arm for the bunk defacer rotor showing the passage of the hydraulic hoses through an opening formed in the right side wall of the loader bucket and into the interior of the right mounting arm to provide a source of hydraulic fluid under pressure to the hydraulic motor supported internally within the right end of the rotor mounted on the distal end of the right mounting arm.

The hydraulic cylinders 28 are operable to cause pivotal movement of the bunk defacing rotor 22 from a retracted inoperative position, as is depicted in FIGS. 1 and 2, and an extended operative position, as is depicted in FIGS. 3 and 4. The extension of the hydraulic cylinders 28 moves the first links 26 in an upward pivotal movement, which pulls the second link 27 upwardly with the first link 26 and, thus, causes a pivotal movement of the mounting arms 24 outwardly from the retracted inoperative position. Since the mounting arms 24 are of fixed length and pivotally mounted at the pivot 19 at the lower, forward position on the side walls 13, the mounting arms 24 will move the rotor 22 forwardly relative to the bucket 11.

The lengths of the first and second links 26, 27 are such that when the hydraulic cylinders 28 are fully extended, the mounting arms 24 have rotated through sufficient rotation to locate the rotor 22 below the level of the front edge 17 of the loader bucket 11, as can be seen best in FIGS. 3 and 4. With reference to FIGS. 1-3 and 6, the first links 26 are provided with a plate 26a that closes off the front face of the housing box 29 when the hydraulic cylinders 28 are retracted and the linkage assembly 25 pulls the rotor 22 into the retracted, inoperative position. These plates 26a limit the movement of any recovered silage material within the loader bucket 11 from entering the box 29 and contaminating the operation of the hydraulic cylinders 28.

When in the fully extended position as shown in FIGS. 3 and 4, the rotor 22 is movable vertically through manipulation of the hydraulic cylinders 4 that control the movement of the boom arms 3, while some pivotal movement of the rotor 22 relative to the loader bucket 11 can be accomplished through manipulation of the hydraulic cylinders 5 controlling the movement of the mounting plate 3. In this manner, the position of the rotor 22 can be controlled by the operator along the generally vertical face of the compacted silage in the silage bunker.

The rotation of the rotor 22 is accomplished by a hydraulic motor 21 mounted internally of the right end of the bunk defacing rotor 22 supported on the right mounting arm 24 and drivingly connected directly to the rotor 22. This hydraulic motor 21 is operable in reversible directions simply through the manipulation of the conventional hydraulic controls within the skid steer loader 1. Accordingly, the bunk defacing rotor 22 is selectively rotatable in either direction to facilitate the dislodging of the compacted silage in the bunker. Upon rotation of the rotor 22, the teeth 23 will disintegrate and dislodge the compacted silage material which will fall by gravity to the bottom of the bunker, as will be described in greater detail below.

The hydraulically operated devices on the attachment 10 are powered from the auxiliary hydraulic system of the skid steer loader 1 by connecting hydraulic hoses 40 to the auxiliary ports 6. For skid steer loaders 1 having multiple auxiliary ports 6, the hydraulic cylinders 28 and the hydraulic motor 21 can have separate hydraulic hoses supplying hydraulic fluid under pressure, which are separately controlled as desired. For tractors or loaders having only one set of auxiliary ports 6, the hydraulic system can include a hydraulic valve (not shown) that can be shuttled between supplying fluid to the cylinders 28 and the motor 21 in an alternative manner, as the motor 21 and the cylinders 28 do not require simultaneous operation.

To handle the hydraulic hoses 40, the attachment 10 is provided with a hose caddy 30 which can be formed with a hollow, tubular channel member 31 having a hollow hose retention member 32 mounted thereon to control the positioning of the hydraulic hoses 40. A first embodiment of the hose caddy 30 is shown in FIGS. 8-12. The hydraulic hoses 40 are directed into the hollow hose retention member 32 so that the hoses 40 can pass through the interior of the hose retention member 32 from the top to the bottom thereof. One skilled in the art will note that the hollow hose retention member 32 preferably includes a bend in the lower portion thereof to direct the exiting of the hydraulic hoses 40 toward the center of the implement 10 mounted on the boom arms 2 of the loader 1. This configuration enables the channel 31 to be pivotally connected to the implement 10, as described in greater detail below, while directing the hydraulic hoses 40 away from the pivot mechanism 35.

The upper portion of the hose caddy 30 can be formed with an enlarged head member 33, or alternatively a hose clamp 34, that secures the hoses 40 and gradually deflects the curving of the hydraulic hoses 40 into the hollow hose retention member 32 from the auxiliary ports 6. One skilled in the art will recognize that the hose caddy 30 can be utilized with hydraulic hoses, pneumatic hoses, or electrical wiring that provide a source of power to the implement 10, such as a loader bucket 11, that would be attached to the distal end of the boom arms 2 of the loader 1.

The channel 31 is pivotally mounted on the back wall 12 of the loader bucket 11 and is oriented in a generally vertical position. The pivotal connection between the hose caddy channel 31 and the back wall 12 is preferably spring-loaded to urge the channel 31 toward the back wall 12. The components of the hinge assembly 35 can best be seen in the exploded view of FIG. 11 and in the enlarged detail view of FIG. 12. The mounting bracket 39 is affixed to the rear corner of the implement 10, such as by welding. The mounting bracket is formed with two concentric bayonet slots 39*a* that have an enlarged head portion. The bolts used to connect the hinge bracket 38 to the mounting bracket 39 are inserted through the corresponding holes in the hinge bracket 38 and then aligned with the enlarged head portions of the bayonet slots 39*a*. The hinge bracket 38 is then rotated so that the bolts pass along the bayonet slots 39*a*. The bolts are then tightened to secure the hinge bracket 38 to the mounting bracket 39. The connection between the hinge bracket 38 and the mounting bracket 39 can be loosened and adjusted so that the hose caddy 30 is oriented in whatever manner is desired according to the limits allowed by the bayonet slots 39*a*.

Figure 8:
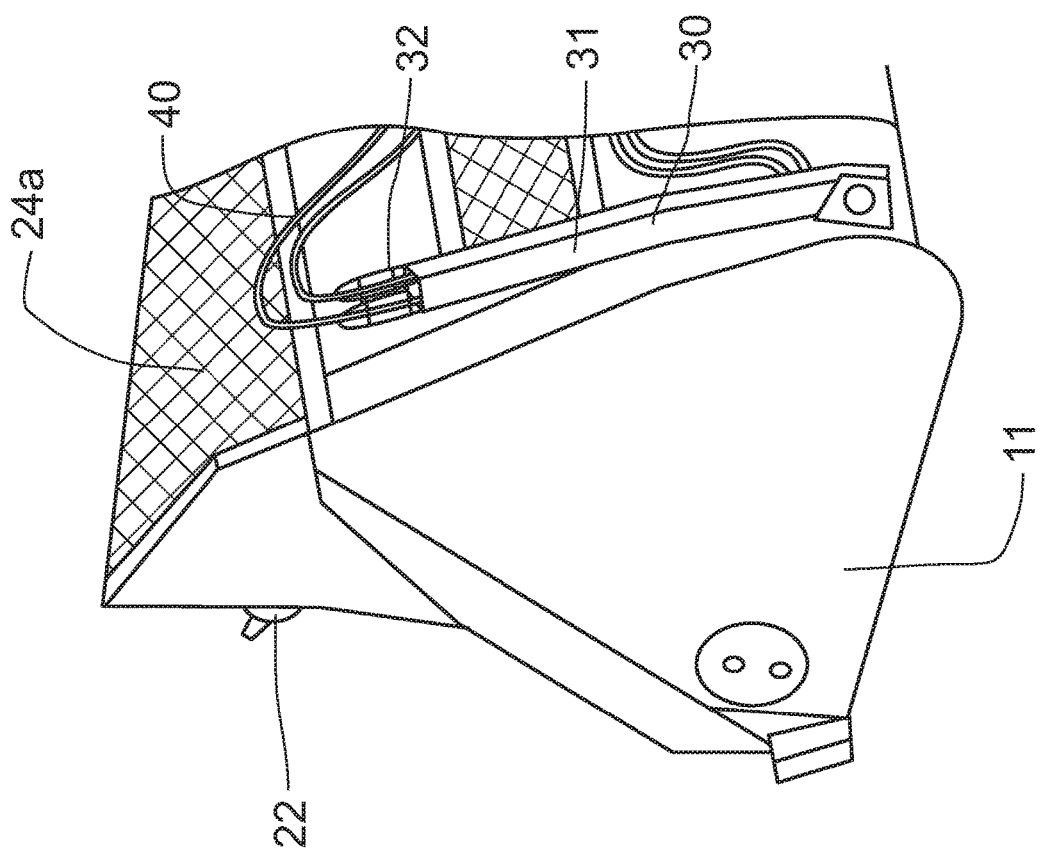
FIG. 8 is an enlarged partial left, rear perspective view of the loader bucket having a hose caddy incorporating the principles of the instant invention pivotally mounted thereto with the loader bucket in a generally horizontal orientation.
Figure 12:
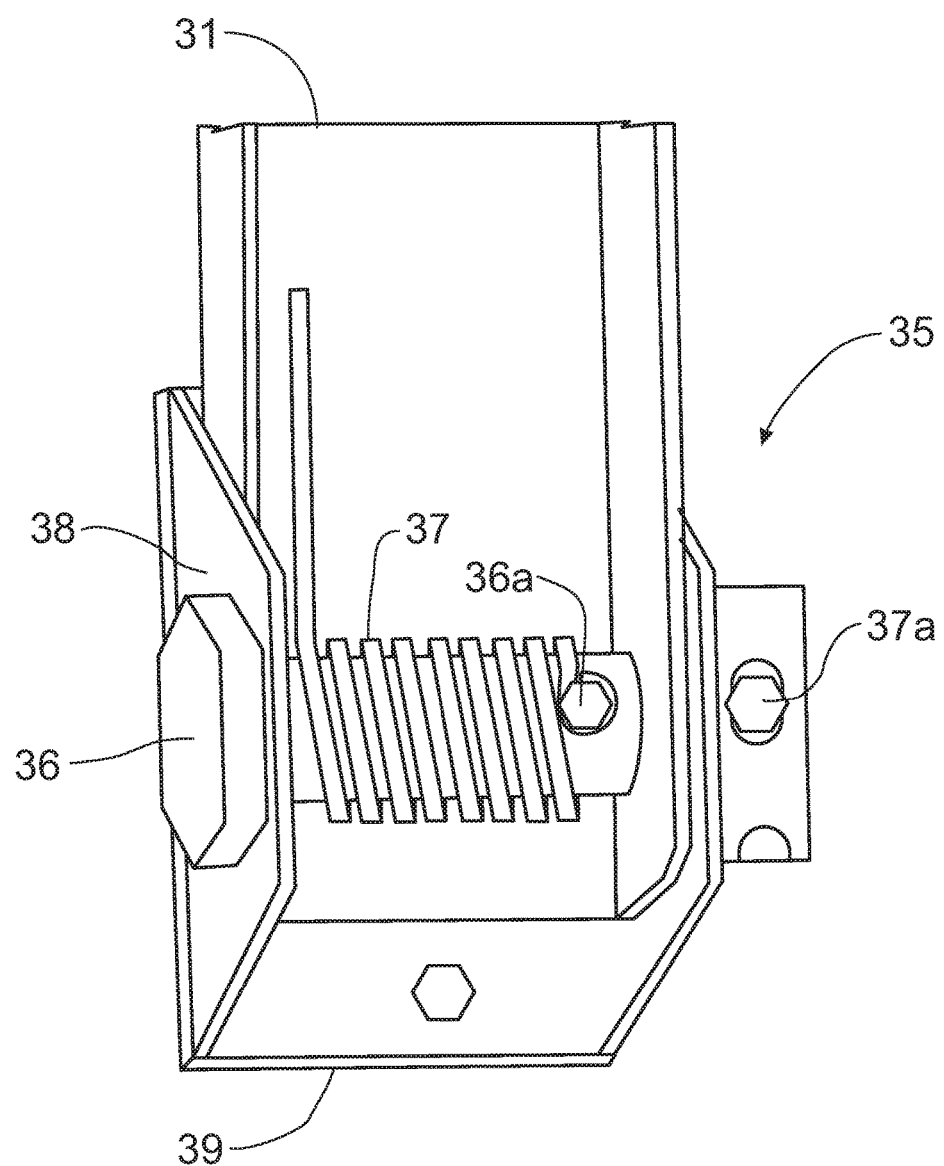
FIG. 12 is an enlarged detail view of the pivotal connection of the hose caddy with a loader bucket showing the spring bias mechanism.

A pivot shaft 36 passes through the corresponding holes in the hinge bracket 38 and the channel 31 to pivotally connect the channel 31 to the back of the implement 10. A biasing spring 37 is mounted on the pivot shaft 36 to urge the channel 31 toward the implement 10. The spring 37 can be secured to the pivot shaft 36 by a spring retention bolt 36*a*. The spring 37 can be compressed to exert a greater spring force by the rotation of the pivot shaft 36, which is then secured to the hinge bracket 38 by the tension setting bolt 37*a*. Once the appropriate pre-load spring force is established, the rotation of the hinge bracket 38 with the pivoted implement 10 (i.e. pivoted relative to the boom arms 2) causes the spring 37 to compress. This compression draws the hose caddy 30 back toward the implement 10 when the implement 10 is returned to its starting position, such as is depicted in FIG. 8.

With the distance between the hose engagement member, i.e. the enlarged head 33 or the hose clamp 34, and the auxiliary ports 6 being fixed due to the fixed length of the hydraulic hoses 40 extending between the hose engagement member and the auxiliary ports 6, the vertical movement of the boom arms 2 or the forward tilting of the mounting plate 3 will result in the pivotal movement of the channel 31 relative to the loader bucket 11, keeping the channel 31 generally vertically upright, as is shown in FIGS. 9 and 10. When the bucket 11 returns to a home position, the biasing spring 37 retracts the channel 31 back toward the back wall 12. As a result, the hydraulic hoses 40 are not moved against the boom arms 2 or against the hydraulic cylinders 4, 5 or against the attachment 10, which would otherwise cause the hoses 40 to rub and wear accordingly.

The routing of hydraulic hoses 40 for the hydraulic motor 21 on the attachment 10 can be accomplished by passing the hoses 40 from the hose caddy 30 into a hollow transverse channel frame member along the rearward side of the back wall 12 and then along the outside of the right side wall 13 through a hollow frame member 15. By forming an opening through the right side wall 13, the hoses 40 can be passed into the interior of the bucket 11 and then up through the interior of the right mounting arm 24 to exit the right mounting arm 24 adjacent the hydraulic motor 21 located internally of the rotor 22. In this manner, the hydraulic hoses 40 for the powering of the hydraulic motor 21 can be safely routed to the remotely positioned hydraulic motor 21 without fear of damage from the loading operation of the loader bucket to remove dislodged silage material.

The loader bucket 11 is also formed with open fencing 18 across the top of and above the back wall 12 to allow the operator seated in the skid steer loader operator compartment to have an open view of the interior of the bucket 11 to monitor the operation of the loading thereof. Also, the back wall 12 is formed with a fence 24*a* mounted at the top portion of the back wall 12 where the rotor is positioned when in the retracted inoperative position, which enables the operator to have safety from dislodged silage material while maintaining the ability to observe the operation of the rotor 22 in defacing the compacted silage material.

An alternative embodiment for the hose caddy 30 can be seen in FIGS. 13-18. Instead of a hollow, tubular channel member as disclosed above for the first embodiment, the hose retention member 41 can be formed into any shape, including a C-channel shape as depicted in FIGS. 13-18. The upper and lower portions of the hose retention member 41 are formed with fastener openings for the passage of appropriate fasteners (not shown) to attach the hose support brackets 42, 43, as described in greater detail below. The upper hose support bracket 42 is bent to provide a planar surface that is not parallel or in alignment with the plane of the hose retention member 41. Accordingly, the lower portion of the upper hose support bracket 42 is secured to the upper end of the hose retention member 41 by a detachable fastener (not shown), and the non-parallel upper portion of the upper hose support bracket 42 has a hose clamp 44 detachably secured thereto by a second fastener (not shown).

The lower hose support bracket 43 is preferably oriented generally horizontally, as opposed to the general vertical orientation of the upper hose support bracket 42. The lower hose support bracket 43 has one portion secured to the back of the C-channel hose retention member 41 by fasteners (not shown) so that the outboard portion of the lower hose support bracket 43 can support a second hose clamp 44 that is offset from the hose retention member 41. The offset position of the second hose clamp 44 enables the hydraulic hoses 40 retained thereby to be eased into the direction the hydraulic hoses 40 need to go for connection to the powered implement 10.

Both the upper and lower hose support brackets 42, 43 are detachable from the hose retention member 41 to enable each of the hose support brackets 42, 43 to be reoriented in a manner that will most appropriately receive and orient the hydraulic hoses 40 without stressing the hoses 40 or forcing sharp bends therein. The upper hose support bracket can be reversed in orientation such that the non-parallel portion overlies the C-channel hose retention member 41 with the lower portion connected to either the front or the back of the hose retention member 41. With this variety in positioning the upper hose support bracket 42, the hose clamp 44 can be mounted on either side of the non-parallel portion to provide a multitude of orientations for the first hose clamp 44 to receive the hydraulic hoses 40 onto the hose caddy 30.

Figure 13:
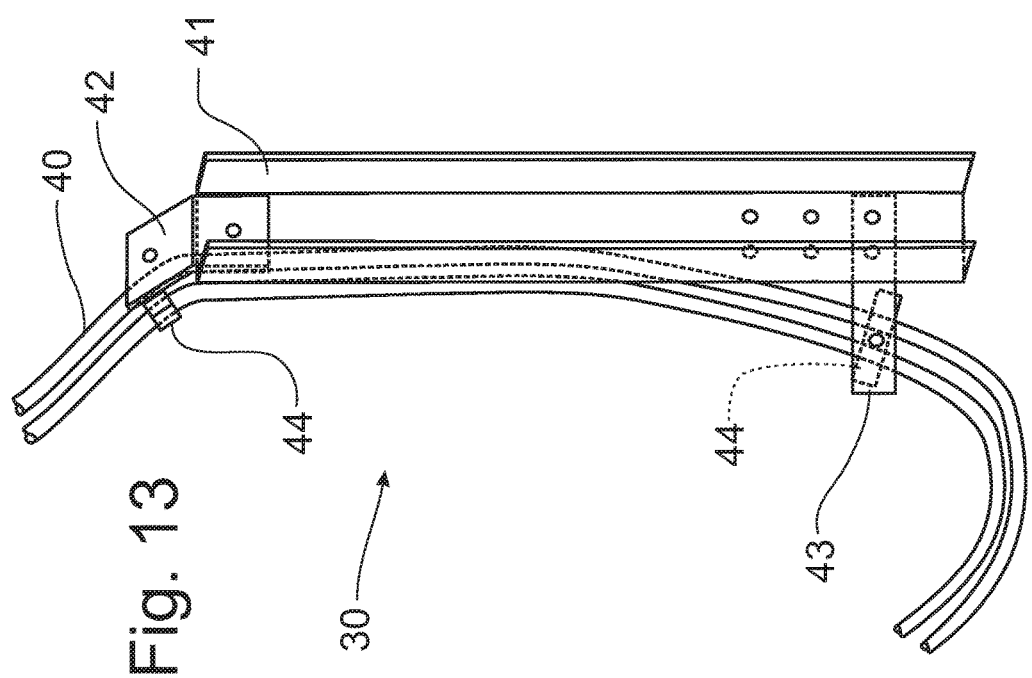
FIG. 13 is a perspective view of a hose caddy support arm forming a part of an alternative embodiment of the hose caddy incorporating the principles of the instant invention.

Similarly, the lower hose support bracket 43 can be mounted in multiple heights corresponding to the different sets of fastener openings through the back wall of the C-channel hose retention member 41, as is shown in FIGS. 13, 15 and 16. Furthermore, the lower hose support bracket 43 can be oriented to position the offset second hose clamp 44 to either selected side of the hose retention member 41. Such a plurality of orientations between the upper and lower hose support brackets 42, 43 will enable the hydraulic hoses 40 to be received and directed into many different positions for the safety and protection of the hydraulic hoses 40 to prevent rubbing against metal objects and to minimize turn angles for the hydraulic hoses 40 to reach the intended hydraulic drive mechanism on the powered implement 10.

Figure 14:
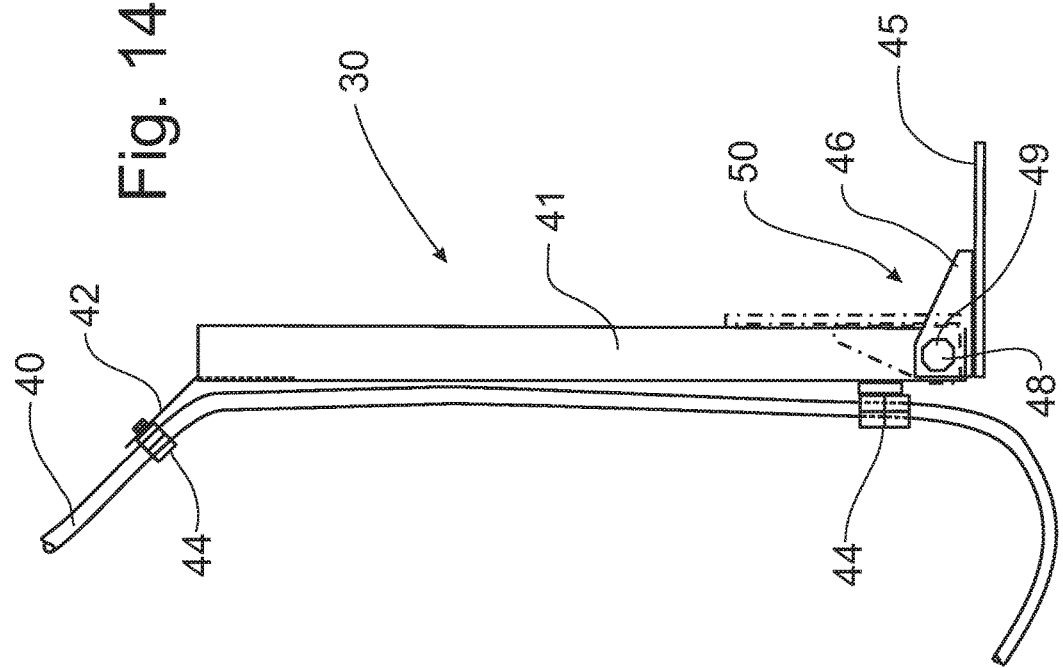
FIG. 14 is a side elevational view of the alternative hose caddy incorporating the principles of the instant invention, the implement attachment bracket in a raised position being shown in phantom.

The lower end of the hose retention member 41 has mounted thereto an implement mounting bracket 45, best seen in FIGS. 14-16. The implement mounting bracket 45 includes a pair of mounting tabs 46 projecting orthogonally from the plane of the implement mounting bracket 45 that receive a pivot pin 48 that extends through the flanges of the C-channel hose retention member 41 and the mounting tabs 46 to pivotally mount the implement mounting bracket 45 to the end of the hose retention member 41. A spring-biasing mechanism 50 is supported on the pivot pin 48 to operably interconnect the hose retention member 41 and the implement mounting bracket 45 in a manner to bias the pivoting of the implement mounting bracket 45 toward the hose retention member 41, or vice versa. The biased state of the implement mounting bracket 45 is depicted in phantom in FIG. 14.

The spring-biasing mechanism 50 is depicted in FIGS. 15 and 16 as being a coil spring 51 that is operated in a torsion manner. One skilled in the art will readily recognize that many alternatives to the preferred coil spring 51 can be utilized to provide the same function, i.e. to bias the pivotal movement of the implement mounting bracket 45 toward the hose retention member 41. Some of these alternative arrangements would include a torsion bar, elastomeric members, hydraulic or pneumatic springs, etc. The intent is to provide a biasing load between the implement mounting bracket 45 and the hose retention member 41 to control the pivotal connection therebetween.

Looking at the preferred embodiment of the spring-biasing mechanism 50 shown in FIGS. 15 and 16, the torsion spring 51 is supported on the pivot pin 48 with one tangential leg 52 secured to the back wall of the hose retention member 41 such as by engagement with a retainer (not shown) secured by the fasteners (not shown) mounting the lower hose support member 43 to the hose retention member 41. The opposing end of the torsion spring 51 can be formed with a loop 53 to enable the spring 51 to be secured to the pivot pin 48 by a fastener 36a, best seen in FIG. 11. The pivot pin 48 extends through the torsion spring 51 and both mounting tabs 46 and through a retainer hub 47 secured, such as by welding, to the adjacent mounting tab 46. A fastener 37a, best seen in FIG. 11, secures the pivot pin 48 to the retainer hub 47 so that the pivot pin 48 will not move relative to the mounting tab 46 or the implement mounting bracket 45.

As a result, the movement of the implement mounting bracket 45 about the pivot axis corresponding to the pivot pin 48 will cause the pivot pin 48 to rotate with the implement mounting bracket 45, due to the connection between the retainer hub 47 and the pivot pin 48 by the fastener 37a, and, thereby, induce torsion into the torsion spring 51 as the end of the spring 51 is secured to the rotating pivot pin 48 by the fastener 36a. With the implement mounting bracket 45 mounted to the end of the hose retention member 41 in a manner that the minimum amount of torsion in the spring 51 is when the implement mounting bracket 45 is in the fully raised position against the structure of the hose retention member 41, as is depicted in phantom in FIG. 14, the movement of the implement mounting bracket 45 away from this fully raised position induces greater torsion into the spring 51.

The preferred configuration of the spring-biasing mechanism 50, as is depicted in FIGS. 11, 12, 15 and 16, allows for the adjustment of the pre-load torsion into the spring 51, as will be described in greater detail below. While having the ability to adjust the pre-load torsion is desirable, this feature is not required for the operation of the spring-biasing mechanism 50 as a predetermined preload can be provided with a different configuration and be functional as a hose caddy 30. In the preferred configuration of the spring-biasing mechanism 50, the preload torsion can be applied as desired after the components have been installed on an implement 10. With the fastener 36a connecting the loop end 53 of the spring 51 to the pivot pin 48, and the fastener 37a disengaged, a socket wrench (not shown) can be applied to the head 49 of the pivot pin 48 to effect a rotation of the pivot pin 48.

With the opposing end 52 of the spring 51 secured against the hose retention member 41, the rotation of the pivot pin 48 induces the preload torsion into the spring 51. Once a desired amount of preload torsion has been attained, the fastener 37a can be inserted into the retainer hub 47 at an opening therein aligned with the corresponding opening at the end of the pivot pin 48 to secure the induced rotation of the pivot pin 48. Under these conditions, the implement mounting bracket 45 will be biased to the fully raised position, as depicted in FIG. 14 in phantom. Then any movement of the implement mounting bracket 45 away from the hose retention member 41 will increase the torsion in the spring 51 and bias the bracket 45 back toward the fully raised position.

The configuration of the hose caddy 30, as depicted in FIGS. 14-16 can be marketed as an after-market kit for installation onto older powered implements 10. The implement mounting bracket 45 is provided with slotted openings (as shown in FIG. 16) that facilitate the mounting of the bracket 45 onto the rear side of the powered implement 10. Installation of the implement mounting bracket 45 would be facilitated if the spring-biasing mechanism 50 was not preloaded with torsion. The upper and lower hose support brackets 42, 43 can be oriented as appropriate for receiving the hydraulic hoses 40 leading from the loader 1 to the powered implement 10. Once the implement mounting bracket 45 has been connected to the back side of a powered implement 10, the hydraulic hoses 40 can be connected to the first and second hose clamps 44 to secure the hydraulic hoses 40 to the hose retention member 41. Preferably at this time, the torsion preload can be induced into the spring-biasing mechanism 50, as described above.

The hose caddy 30 would then be operational. The initial orientation of the hose retention member 41 would be dependent on the length of the hydraulic hoses 40 leading from the loader 1 to the first hose clamp 44 on the upper hose support bracket 42. Preferably, this initial orientation would be substantially vertical. The powered implement 10 is pivotally movable through manipulation of the second hydraulic cylinders 5. When tipped forwardly, the hose retention member is retained in the initial orientation, assuming that all of the slack in the hydraulic hoses 40 had been eliminated at the time of installation. If not, the bias exerted by the spring 51 will pull the hose retention member 41 toward the implement mounting bracket 45 until the slack in the hydraulic hoses is eliminated. This positioning of the hose retention member 41 keeps the hydraulic hoses 40 from rubbing against the boom arms 2, or the powered implement 10, which will increase the operative life of the hydraulic hoses 40.

In the description above regarding the structure and operation of the hose caddy 30, the reference number 10 is intended to be directed to any powered implement, of which the combination bunk defacer and loader bucket would be one example. There is no intent to limit the use or operation of the hose caddy 30 to only bunk defacers. One skilled in the art will also recognize that the use of the hose caddy 30 is not limited to controlling hydraulic hoses 40, as the powered implement 10 could include electrically powered components which require connection to electrical wiring operably connected to the prime mover. Accordingly, the hose caddy 30 would be effective to control wiring instead of, or in addition to, the hydraulic hoses 40.

With respect to the operation of the combination bunk defacer and loader bucket implement 10, the implement 10 is mounted on the prime mover, such as on the mounting plate 3 of a skid steer loader 1, and transported to the silage bunker. The hydraulic cylinders 28 can be extended to push on the linkage assembly 25 and move the bunk defacing rotor 22 from the retracted, inoperative position shown in FIGS. 1 and 2 toward the extended, operative position shown in FIGS. 3 and 4. Since the rotor 22, when fully extended, is located below the level of the front edge 17 of the loader bucket 11, the bucket 11 should be raised accordingly to prevent the rotor 22 from impacting the ground or the floor of the silage trench. The loader hydraulics can then be manipulated to raise the boom arms 2 an appropriate amount to locate the rotor 22 at the top of the bunker of compacted silage material. The loader can be positioned to allow the rotor to engage the front face of the compacted silage and the hydraulic motor 28 can be operated to cause rotation of the rotor 22 in either direction as needed to dislodge the compacted silage material. Movement of the hydraulic cylinders 4, 5 can keep the rotor engaged appropriately with the silage material as the rotor teeth 23 disintegrate and dislodge the silage material, which falls by gravity to the bottom of the silage trench.

Once sufficient amounts of silage material has been dislodged from the bunker, the hydraulic motor 21 is stopped and the hydraulic cylinders 28 are retracted to collapse the linkage assembly 25, which in turn draws the rotor 22 into the retracted, inoperative position against the upper part of the back wall 12. This retraction of the hydraulic cylinders 28 pulls the first links 26 downwardly to re-position the plates 26a on the first links 26 against the housing boxes 29 to close the boxes 29 and trap the hydraulic cylinders 28 inside. The loader bucket 11 can then be used to scoop up the dislodged silage material from the bottom of the silage bunker and transport the collected material to a remote place to feed animals. One skilled in the art will note that the housing boxes 29 are open through the back wall 12 of the loader bucket 11 so that any silage material that might enter into the housing boxes 29 will fall out when the bucket 11 is tilted backward and raised through manipulation of the hydraulic cylinders 4, 5.

One skilled in the art will recognize that the mounting of the bunk defacer 20 internally of the loader bucket 11 and the use of the hydraulic cylinder 28 which is also mounted and operable internally of the loader bucket 11 requires the structure of the loader bucket 11 to resist a lot of operational forces. As a result, the outwardly flared forward edge 14 of the bucket side walls 13 and the flared forward edge 17 of the floor 16 of the loader bucket 11 provide structural rigidity to resist these operational forces. In addition, the outwardly flared forward edges 14 provide structure along the front edge of the loader bucket 11 that other operative structures can be mounted on the outside surface of the side walls 13 and still be protected behind the outwardly flared forward edges 14. For example, one such structure is the pivot structure 19 for the pivotal mounting of the mounting arms 24. If oversized bearings are required to provide proper operation of the pivot 19, the outwardly flared forward edge 14 will shield any protruding bearing structure for the pivot 19. Another example is the external channel 15 on the right side wall 13.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A hose caddy for use in conjunction with a powered implement mounted on distal ends of forwardly projecting boom arms of a prime mover, said powered implement having a powered component connected by conduits or wiring to said a corresponding source of power carried by said prime mover, comprising:
    an elongated retention member having a lower pivot end and an upper distal end;
    a first support bracket detachably mounted on said upper distal end of said retention member, said first support bracket having detachably mounted thereon a first hose clamp to engage said conduits or wiring;
    a second support bracket detachably mounted on said retention member proximate to said lower pivot end, said second support bracket having a second hose clamp detachably mounted thereon to engage said conduits or wiring to control the positioning thereof relative to said retention member;
    an implement mounting bracket for detachably mounting on said implement, said retention member being pivotally connected to said implement mounting bracket at said lower pivot end a pivot pin; and
    a torsion spring operatively interconnecting said retention member and said powered implement to bias movement of the retention member toward said powered implement, said torsion spring being mounted on said pivot pin to bias said implement mounting bracket and said retention member toward a fully raised position.

2. The hose caddy of claim 1 wherein said torsion spring is a coil spring having a first end secured to said retention member and a second end connected to said pivot pin, said pivot pin being rotatable relative to said retention member and selectively secured to said retention member to vary forces applied to said retention member to bias the pivotal movement of said retention member relative to said implement mounting bracket.

3. A hose caddy for use in conjunction with a powered implement mounted on distal ends of forwardly projecting boom arms of a prime mover, said powered implement having a powered component connected by conduits or wiring to said a corresponding source of power carried by said prime mover, comprising:
    an elongated retention member having a lower pivot end and an upper distal end;
    an implement mounting bracket detachably affixed to said powered implement and being pivotally connected to said lower pivot end of said retention member by a pivot pin;
    a receiving member support on said upper distal end to engage said conduits or wiring, said receiving member including a first support bracket detachably mounted on said upper distal end of said retention member, said first support bracket having detachably mounted thereon a first hose clamp for engaging said conduits or wiring;
    a second support bracket detachably mounted on said retention member proximate to said lower pivot end, said second support bracket having a second hose clamp detachably mounted thereon to engage said conduits or wiring to control the positioning thereof relative to said retention member; and a torsion spring mounted on said pivot pin to bias said retention member relative to said implement mounting bracket toward a fully raised position, said torsion spring being a coil spring having a first end secured to said retention member and a second end operatively secured to said implement mounting bracket.

4. The hose caddy of claim 3 wherein said torsion spring is supported on said pivot pin, said second end of said coil spring being connected to said pivot pin, said pivot pin being connected to said implement mounting bracket for rotation relative to said retention member in conjunction of the pivotal movement of said implement mounting bracket relative to said retention member.

5. The hose caddy of claim 3 wherein said elongated retention member is formed as a tubular member defining an interior cavity, said conduits or wiring passing through said interior cavity of said retention member and exiting said interior cavity of said retention member at an opening in said retention member offset from said pivot pin.

* * * * *